(12) United States Patent
Shu et al.

(10) Patent No.: US 9,729,503 B2
(45) Date of Patent: Aug. 8, 2017

(54) NETWORK NAME PROCESSING METHOD AND MOBILITY MANAGEMENT NETWORK ELEMENT DEVICE

(71) Applicant: Huawei Technologies Co., LTD, Shenzhen (CN)

(72) Inventors: Lin Shu, Shanghai (CN); Huan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/159,687

(22) Filed: Jan. 21, 2014

(65) Prior Publication Data

US 2014/0135000 A1    May 15, 2014

Related U.S. Application Data (63) Continuation of application No. PCT/CN2011/077811, filed on Jul. 29, 2011.

(51) Int. Cl.
*H04L 29/12* (2006.01)
*H04W 48/12* (2009.01)
*H04W 8/08* (2009.01)

(52) U.S. Cl.
CPC .......... *H04L 61/3015* (2013.01); *H04W 8/08* (2013.01); *H04W 48/12* (2013.01)

(58) Field of Classification Search
CPC ......... H04W 48/12; H04W 8/08; H04W 4/26; H04W 4/16; H04W 76/043; H04L 61/3015; H04L 61/2007

(Continued)

(56) References Cited

U.S. PATENT DOCUMENTS

2002/0193125 A1* 12/2002 Smith .......................... 455/458
2012/0100892 A1*  4/2012 Arzelier et al. .............. 455/566

FOREIGN PATENT DOCUMENTS

CN     1870825 A    11/2006
CN     1889789 A     1/2007

(Continued)

OTHER PUBLICATIONS

"3rd Generation Partnership Project; Technical Specification Group Core Network and Terminals; Non-Access-Stratum (NAS) protocol for Evolved Packet System (EPS); Stage 3 (Release 10)," 3GPP TS 24.301 V10.3.0, Technical Specification, Jun. 2011, 316 pages.

(Continued)

*Primary Examiner* — Phuoc H Doan
(74) *Attorney, Agent, or Firm* — Slater Matsil, LLP (57) ABSTRACT

Embodiments of the present invention provide a network name processing method and a mobility management network element. The network name processing method includes receiving a network name sent by a mobile switching center/visitor location register MSC/VLR. The received network name is processed. The mobility management information message is sent to a terminal and according to a processing result based on the processed received network name to enable the terminal to display the network name of the registered network of the terminal. According to the embodiments of the present invention, the terminal always display the network name of the registered network of the terminal, thereby ensuring consistency in the network name display of the terminal, and improving user experience.

4 Claims, 3 Drawing Sheets

(58) Field of Classification Search
USPC .................. 455/433, 458, 566, 552.1, 556.1; 370/329, 431
See application file for complete search history.

(56) References Cited

FOREIGN PATENT DOCUMENTS

| | | |
|---|---|---|
| CN | 101106786 A | 1/2008 |
| EP | 2048891 A1 | 3/2007 |

OTHER PUBLICATIONS

"3rd Generation Partnership Project; Technical Specification Group Services and System Aspects; Circuit Switched (CS) fallback in Evolved Packet System (EPS); Stage 2 (Release 10)," 3GPP TS 23.272 V10.4.0, Technical Specification, Jun. 2011, 78 pages.

"3rd Generation Partnership Project; Technical Specification Goup Core Network and Terminals; Mobility Management Entity (MME)—Visitor Location Register (VLR) SGs interface specification (Release 10)," 3GPP TS 29.118 V10.3.0, Technical Specification, Mar. 2011, 59 pages.

Chinese International Search Report, Application No. PCT/CN2011/077811, dated Apr. 26, 2012, 11 pages.

Extended European Search Report, Application No. 11867290.6, Applicant: Huawei Technologies Co., Ltd., date Aug. 21, 2014, 7 pages.

Alcatel-Lucent, et al., "GSM/EDGE RAN sharing," 3GPP TSG GERAN Meeting #46, GP-100620, Jeju Island, May 17-21, 2010, 6 pages.

\* cited by examiner

NETWORK NAME PROCESSING METHOD AND MOBILITY MANAGEMENT NETWORK ELEMENT DEVICE

This application is a continuation of International Application No. PCT/CN2011/077811, filed on Jul. 29, 2011, which is hereby incorporated by reference in its entirety.

TECHNICAL FIELD

Embodiments of the present invention relate to the field of radio communications, and in particular, to a network name processing method and a mobility management network element device.

BACKGROUND

The 3rd Generation Partnership Project (3GPP) releases an evolved packet system (EPS) based on existing 2G and 3G networks. An EPS network includes an Evolved universal mobile telecommunication system territorial radio access network (E-UTRAN) and an evolved packet core network (EPC). During an early stage in construction of an EPS network, a carrier already has a mature circuit switched (CS) network and the EPS network processes only packet switched (PS) services. To protect an investment on the CS network and satisfy requirements on deployment policies of the EPS network, a carrier may use existing CS network devices to provide CS services. To satisfy the requirements, the 3GPP extends Gs interface functionality between a mobile switching center/visitor location register (MSC/VLR) and a serving GPRS support node (SGSN). An SGs interface between the MSC/VLR and a mobile management entity (MME) is defined on the EPC network. Based on the SGs interface functionality, the 3GPP specifies a circuit switched fallback (CSFB) technology and an SGs short message transmission (SMS over SGs) technology. The CSFB technology enables a user equipment (UE) covered by an E-UTRAN to fall back to a 2G/3G network CS domain to complete service processing over the E-UTRAN when the UE needs to process a CS voice service. The SMS over SGs technology enables a UE camping on the E-UTRAN to reuse existing CS domain devices to implement CS short message transmission.

To reduce deployment cost of a radio access network for a carrier, the 3GPP defines an idea of network sharing. That is, public land mobile networks (PLMN) of a plurality of carriers or a plurality of PLMNs of a carrier may share the same radio access network to provide radio communication services. For the CSFB technology and the SMS over SGs technology, carriers also raise a desire for CS domain network sharing, which mainly includes the following two scenarios. In one scenario, a traditional carrier upgrades the existing 2G/3G CS network to support the CSFB technology and the SMS over SGs technology. That is, a carrier may share its own plurality of PLMNs or share a PLMN of another carrier by signing a roaming protocol to provide the CS services for a UE camping on the E-UTRAN. In another scenario, a rising pure-PS service carrier may sign a protocol to lease the 2G/3G CS network from a traditional carrier to support the CSFB technology and the SMS over SGs technology.

In the CS domain network sharing scenario, a plurality of available PLMNs may provide the CS services for the same UE camping on an E-UTRAN. In a combined attach procedure or a combined tracking area update procedure, if a plurality of available PLMNs provide the CS services for the UE, the MME selects a suitable PLMN according to a PLMN reported by an evolved NodeB (eNodeB), location information of a tracking area where a UE is currently located, and a CS network selection policy of a carrier. Based on the selected PLMN and the location information of the tracking area where the UE is located, the MME assigns a corresponding CS domain location area identity (LAI) to the UE, and selects an associated MSC/VLR based on the LAI.

After successfully registering to a carrier's network, a terminal should display a name of the registered network to a user of the terminal. Currently, displaying of a network name is mainly based on two types of policies. In one type of policy, a network side directly sends a network name to a UE. In another type of policy, a network side does not perform configuration, and a UE displays a network name according to its own configuration. A network name sent by a network side includes a network name of a registered CS network sent by an MSC/VLR over an SGs interface. If the MSC/VLR sends a name of a registered CS network to an MME, the MME transparently transmits the network name to the UE.

In the CS domain network sharing scenario, a CS PLMN selected by the MME for the UE may be different from a home PLMN of the MME. That is, the network name of the registered CS network sent by the MSC/VLR over the SGs interface is different from the network name of the UE's currently registered PS network. As a result, after performing a CSFB service or an SMS over SGs service, the UE displays a different network name to the user, that is, displays the network name of the registered CS network to the user. For an E-UTRAN terminal user, user experience deteriorates. In other words, the currently displayed network name is not a registered network of the user, bringing high complaint risks to a carrier.

In addition, on the traditional 2G/3G network, a registered CS PLMN of the terminal may be different from a registered PS PLMN of the terminal. If the MSC/VLR sends a name of a registered CS network over the Gs interface, an SGSN forwards the network name to the terminal, similarly resulting in the inconsistency of a network name.

SUMMARY OF THE INVENTION

Embodiments of the present invention provide a network name processing method and a mobility management network element device to solve the inconsistency problem between a network name displayed by a terminal and a registered network name.

In one aspect, an embodiment of the present invention provides a network name processing method, where the method includes receiving a network name sent by a mobile switching center/visited location register MSC/VLR. The received network name is processed, and according to a processing result, a mobility management information message is sent to a terminal to enable the terminal to display a network name of a registered network of the terminal.

In another aspect, an embodiment of the present invention provides a mobility management network element device, where the device includes a receiving unit configured to receive a network name sent by a mobile switching center/visited location register MSC/VLR. A processing unit is configured to process the network name received by the receiving unit, and send a mobility management information message to a terminal, according to a processing result based on the processed received network name, to enable the terminal to display a network name of a registered network of the terminal.

According to the embodiments of the present invention, a network name received by a receiving unit is processed and a mobility management information message is sent to a terminal according to a processing result to enable the terminal to always display a network name of a registered network of the terminal to avoid a change of the network name display of the terminal, thereby ensuring consistency in the network name display of the terminal, and improving user experience.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The technical solutions of the present invention are hereinafter described in detail with reference to the accompanying drawings. It is evident that the embodiments are only some embodiments of the present invention, and the present invention is not limited to such embodiments. Other embodiments that those skilled in the art derived based on embodiments of the present invention also fall within the protection scope of the present invention.

The technical solutions in the present invention may be applied to various communications systems, such as, a global system for mobile communications (GSM), a code division multiple access (CDMA) system, a wideband code division multiple access (WCDMA) system, a general packet radio service (GPRS) system, a long term evolution (LTE) system, and the like.

A terminal may also be referred to as a user equipment (UE), a mobile user equipment, and the like, which may communicate with one or more core networks over a radio access network (RAN). The terminal may be a mobile terminal, such as, a mobile phone (or referred to as a "cellular" phone) and a computer having a mobile terminal, for example, a mobile device that is portable, miniature, handheld, built in a computer or mounted on a vehicle, which exchanges language and/or data with the radio access network. The present invention set no limitation on the terminal. To ease illustration, the following embodiments use a UE as an example.

A mobility management network element may be a serving GPRS support node SGSN of a 2G/3G network and a mobility management entity (MME) of an EPC network. The present invention sets no limitation on the mobility management network element. To ease illustration, the following embodiments use an MME as an example.

For example, in a CS domain network sharing scenario, if a name of a PS domain network that a terminal has registered to is different from a registered CS domain network name, the network name displayed on the terminal changes because a CS service has been performed, resulting in deterioration of user experience. Embodiments of the present invention ensure consistency in the network name display of the terminal.

Figure 1:
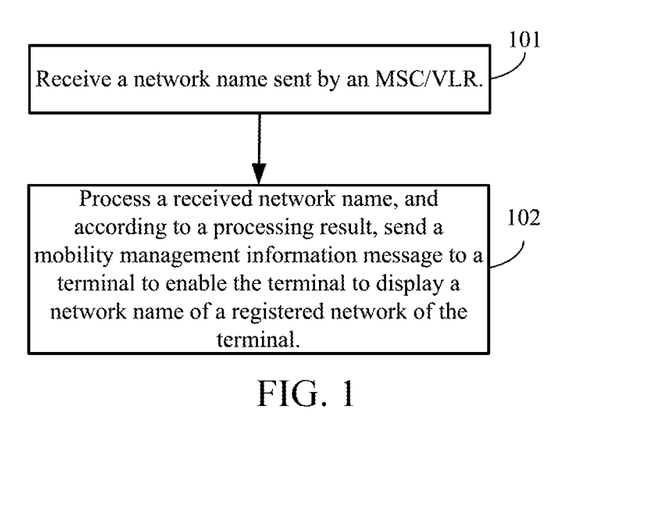
FIG. 1 is a schematic flowchart of a network name processing method according to an embodiment of the present invention.

FIG. 1 is a schematic flowchart of a network name processing method according to an embodiment of the present invention. The method illustrated FIG. 1 is performed by a mobility management network element (for example, an MME or an SGSN). The following uses the case in which the MME functions as a mobility management network element as an example to illustrate embodiments of the present invention. However, the present invention is not limited to the mobile management network element, and the method according to the present intention may also be applied in other types of mobility management network elements, for example, an SGSN of the 2G/3G network.

Step 101: Receive a network name sent by an MSC/VLR.

After a terminal successfully registers with a CS domain network, the MSC/VLR sends a network name of the registered CS domain network (that is, a home network name of the MSC/VLR) to an MME over an SGs interface. In other words, the network name received by the MME in step 101 is the home network name of the MSC/VLR, which, however, may be inconsistent with a network name of the registered network of the terminal (that is, the MME's own home network name).

On a 2G/3G network, the network name of the registered network of the terminal may be a name of a network of a routing area to which a cell where the terminal currently camps belongs. On an EPC network, the network name of the registered network of the terminal may be a name of a network of a tracking area to which a cell where the terminal currently camps belongs.

Step 102: Process the received network name, and according to a processing result, send a mobility management information message to a terminal to enable the terminal to display a network name of a registered network of the terminal.

Optionally, in an embodiment, an MME may directly replace a received network name with a network name of a home network of the MME (that is, a network name of a registered network of a terminal), and carry the network name after the replacing in a mobility management information (MM INFORMATION) message to the terminal. The network name after the replacing is consistent with the network name of the registered network of the terminal, thereby ensuring that the network name displayed on the terminal does not change.

Or, in another embodiment, an MME first compares whether a received home network name of an MSC/VLR is consistent with an MME's home network name, and then performs consistency processing on the received network name according to a comparison result. Specifically, if the received network name is the same as a network name of a registered network of a terminal, the MME keeps the received network name unchanged; or, if the received network name is different from a network name of a registered network of a terminal, the MME replaces the received network name with the network name of the registered network of the terminal. In this way, the network name after the consistency processing is consistent with the network name of the registered network of the terminal, and finally the network name carried in an MM INFORMATION message is still consistent with the network name of the registered network of the terminal, thereby ensuring that the network name displayed on the terminal does not change.

Or, in another embodiment, an MME may discard a received network name, and does not carry any network name in an MM INFORMATION message sent to a terminal, thereby ensuring that the network name displayed on the terminal does not change.

Therefore, according to the embodiments of the present invention, a network name received by a receiving unit is processed and a mobility management information message is sent to a terminal according to a processing result to enable the terminal to always display a network name of a registered network of the terminal to avoid a change of the network name display of the terminal, thereby ensuring consistency in the network name display of the terminal, and improving user experience.

Figure 2:
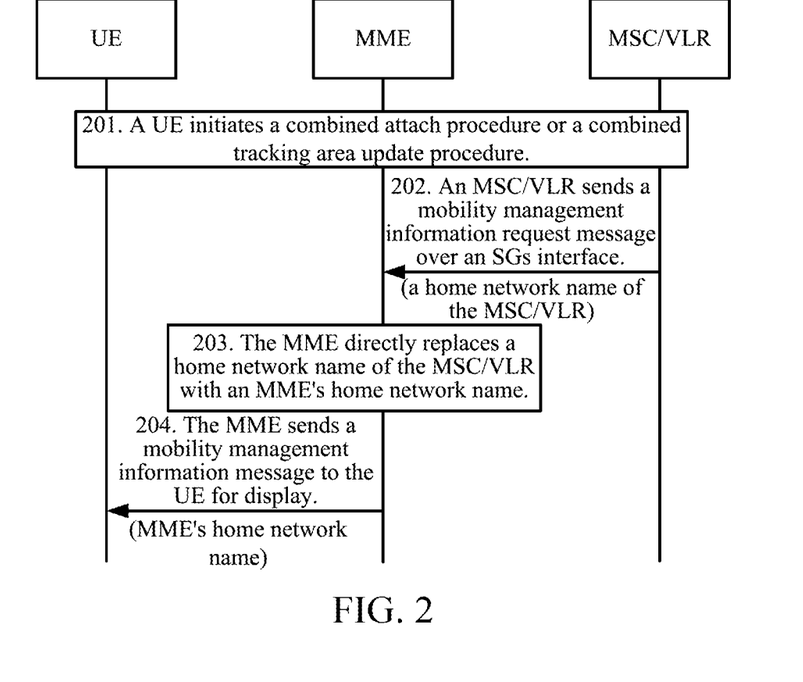
FIG. 2 is a schematic flowchart of a network name processing procedure according to an embodiment of the present invention.

The following describes the embodiments of the present invention in more details in combination with specific examples. FIG. 2 is a schematic flowchart of a network name processing procedure according to an embodiment of the present invention. In the embodiment illustrated in FIG. 2, after a UE successfully registers with a CS domain network, an MSC/VLR sends a network name of the registered CS network (that is, a home network name of the MSC/VLR) to an MME over an SGs interface. The MME directly replaces the home network name of the MSC/VLR with an MME's home network name (that is, a network name of a registered PS network of the UE) and sends the same to a UE for display. The basic idea of this embodiment is that the MME always displays the MME's home network name to the UE for display.

Step 201: A UE initiates a combined attach procedure or a combined tracking area update procedure. In step 201, an MME selects a suitable PLMN according to a PLMN reported by an eNodeB, location information of a tracking area where the UE currently is located, and a CS network selection policy of a carrier. Based on the selected PLMN and the location information of the tracking area where the UE is located, the MME assigns a corresponding CS domain LAI to the UE, and selects an associated MSC/VLR based on the LAI. The MME initiates a location update request to the selected MSC/VLR to complete the UE's registration to a CS network.

Step 202: After the UE successfully registers with the CS network, the MSC/VLR initiates a mobility management information procedure over an SGs interface according to a carrier's configuration policy, and carries a network name of the registered CS network (that is, a home network name of the MSC/VLR) in a request message to the MME.

Step 203: After the MME receives the mobility management information request sent by the MSC/VLR over the SGs interface, the MME directly replaces a home network name of the MSC/VLR with an MME's home network name, that is, a network name of a registered PS network of the UE.

Step 204: The MME sends the network name after the replacing in a mobility management information message to the UE for display.

Therefore, this embodiment enables the terminal to always display a network name of a registered network of the terminal to avoid a change of the network name display of the terminal, thereby ensuring consistency in the network name display of the terminal, and improving user experience.

Figure 3:
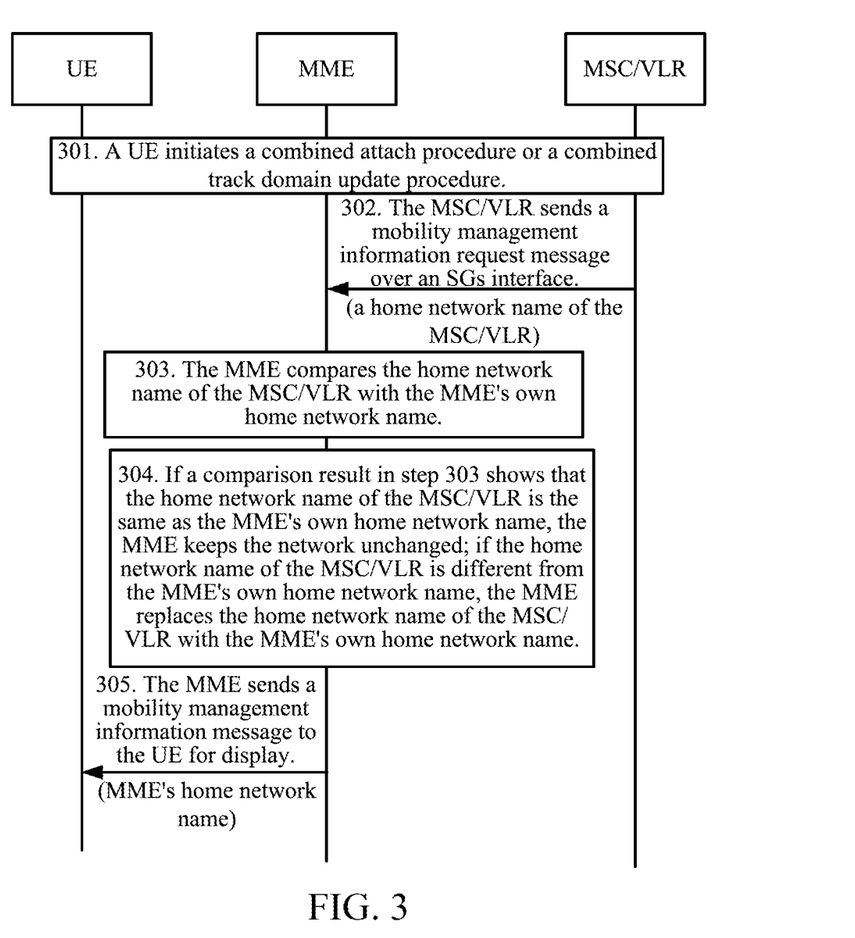
FIG. 3 is a schematic flowchart of a network name processing procedure according to another embodiment of the present invention.

FIG. 3 is a schematic flowchart of a network name processing procedure according to another embodiment of the present invention. In the embodiment illustrated in FIG. 3, after a UE successfully registers with a CS domain network, an MSC/VLR sends a network name of the registered CS network (that is, a home network name of the MSC/VLR) to an MME over an SGs interface. The MME compares whether the home network name of the MSC/VLR is consistent with an MME's home network name, if the two are the same, the MME keeps the network name unchanged, but if the two are different, the MME replaces the home network name of the MSC/VLR with the MME's own home network name (that is, a network name of a registered PS network of the UE) and sends it to the UE for display. The basic idea of this embodiment is that the MME determines the network name to be sent to the UE by comparing the consistency or inconsistency between the home network name of the MSC/VLR and the MME's own home network name.

Step 301: Similar to step 201, a UE initiates a combined attach procedure or a combined tracking area update procedure. In this procedure, an MME selects a suitable PLMN according to a PLMN reported by an eNodeB, location information of a tracking area where the UE currently is located, and a CS network selection policy of a carrier. Based on the selected PLMN and the location information of the tracking area where the UE is located, the MME assigns a corresponding CS domain LAI to the UE, and selects an associated MSC/VLR based on the LAI. The MME initiates a location update request to the selected MSC/VLR to complete the UE's registration to a CS network.

Step 302: Similar to step 202, after the UE successfully registers with the CS network, the MSC/VLR initiates a mobility management information procedure over an SGs interface according to a carrier's configuration policy, and carries a network name of the registered CS network (that is, a home network name of the MSC/VLR) in a request message to the MME.

Step 303: After the MME receives the mobility management information request sent by the MSC/VLR over the SGs interface, the MME compares the home network name of the MSC/VLR with the MME's own home network name.

Step 304: If a comparison result in step 303 shows that the home network name of the MSC/VLR is the same as the MME's own home network name, the MME keeps the network unchanged; and if the home network name of the MSC/VLR is different from the MME's own home network name, the MME replaces the home network name of the MSC/VLR with the MME's own home network name, that is, a network name of a registered PS network of the UE.

Step 305: The MME sends the network name after the consistency processing in steps 303-304 in a mobility management information message to the UE for display.

Therefore, this embodiment enables the terminal to always display a network name of a registered network of the terminal to avoid a change of the network name display of the terminal, thereby ensuring consistency in the network name display of the terminal, and improving user experience.

Figure 4:
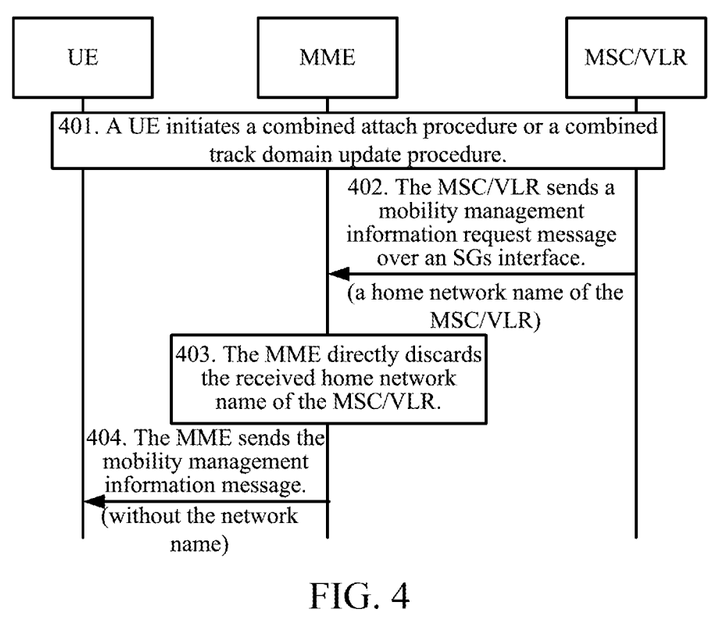
FIG. 4 is a schematic flowchart of a network name processing procedure according to another embodiment of the present invention.

FIG. 4 is a schematic flowchart of a network name processing procedure according to another embodiment of the present invention. In the embodiment illustrated in FIG. 4, after a UE successfully registers with a CS domain network, an MSC/VLR sends a network name of the registered CS network (that is, a home network name of the MSC/VLR) to an MME over an SGs interface. The MME directly discards the received home network name of the MSC/VLR, and does not carry the network name in the mobility management information procedure. The basic idea of this embodiment is that the MME directly discards the received home network name of the MSC/VLR, thereby ensuring that the network name on the UE side does not change.

Step 401: Similar to step 201, a UE initiates a combined attach procedure or a combined tracking area update procedure. In this procedure, an MME selects a suitable PLMN according to a PLMN reported by an eNodeB, location information of a tracking area where the UE currently is located, and a CS network selection policy of a carrier. Based on the selected PLMN and the location information of the tracking area where the UE is located, the MME assigns a corresponding CS domain LAI to the UE, and selects an associated MSC/VLR based on the LAI. The MME initiates a location update request to the selected MSC/VLR to complete the UE's registration to a CS network.

Step 402: Similar to step 202, after the UE successfully registers with the CS network, the MSC/VLR initiates a mobility management information procedure over an SGs interface according to a carrier's configuration policy, and carries a network name of the registered CS network (that is, a home network name of the MSC/VLR) in a request message to the MME.

Step 403: After the MME receives the mobility management information request sent by the MSC/VLR over the SGs interface, the MME directly discards the received home network name of the MSC/VLR.

Step 404: The MME does not carry the network name in the mobility management information procedure. That is, the network name display on the UE does not change.

Therefore, this embodiment enables the terminal to always display a network name of a registered network of the terminal to avoid a change of the network name display of the terminal, thereby ensuring consistency in the network name display of the terminal, and improving user experience.

An embodiment of the present invention provides a network name processing method. In a CS domain network sharing scenario, if a name of a registered PS network of a terminal is different from a name of a registered CS network, and an MSC/VLR sends the name of the CS domain network to the terminal, this embodiment enables the network side to always send the name of the PS domain network to the terminal for display according to a carrier's policy on network name display to avoid a change of the network name display of the terminal due to performing of a CS service, thereby ensuring consistency in the network name display of the terminal, and improving user experience.

Figure 5:
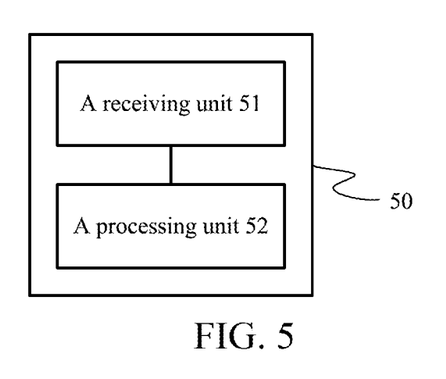
FIG. 5 is a schematic block diagram of a mobility management network element device according to an embodiment of the present invention.

FIG. 5 is a schematic block diagram of a mobility management network element device according to an embodiment of the present invention. A mobility management network element device 50 illustrated in FIG. 5 may be a serving GPRS support node SGSN of a 2G/3G network or a mobility management entity (MME) of an EPC network.

As illustrated in FIG. 5, the mobility management network element device 50 consists of a receiving unit 51 and a processing unit 52.

The receiving unit 51 receives a network name sent by an MSC/VLR.

After a terminal successfully registers with a CS domain network, an MSC/VLR sends a network name of the registered CS domain network (that is, a home network name of the MSC/VLR) to an MME over an SGs interface. In other words, the network name received by the receiving unit 51 is the home network name of the MSC/VLR, which, however, may be inconsistent with a network name of the registered network of the terminal (that is, the MME's own home network name).

On a 2G/3G network, the network name of the registered network of the terminal may be a name of a network of a routing area to which a cell where the terminal currently camps belongs. On an EPC network, the network name of the registered network of the terminal may be a name of a network of a tracking area to which a cell where the terminal currently camps belongs.

The processing unit 52 processes a network name received by the receiving unit 51, and according to a processing result, sends a mobility management information message to a terminal to enable the terminal to display a network name of a registered network of the terminal.

Optionally, in an embodiment, the processing unit 52 may directly replace a network name received by the receiving unit 51 with a network name of a home network of the MME (that is, a network name of a registered network of a terminal), and carries the network name after the replacing in an MM INFORMATION message to the terminal. The network name after the replacing is consistent with the network name of a registered network of the terminal, thereby ensuring that the network name displayed on the terminal does not change.

Or, in another embodiment, the processing unit 52 first compares whether a home network name of an MSC/VLR received by the receiving unit 51 is consistent with the MME's own home network name, and then performs consistency processing on the received network name according to a comparison result. Specifically, if the received network name is the same as a network name of a registered network of a terminal, the processing unit 52 keeps the received network name unchanged; or, if the received network name is different from a network name of a registered network of a terminal, the processing unit 52 replaces the received network name with the network name of the registered network of the terminal. In this way, the network name after the consistency processing is consistent with the network name of the registered network of the terminal, and finally the network name carried in an MM INFORMATION message sent by the processing unit 52 to the terminal is still consistent with the network name of the registered network of the terminal, thereby ensuring that the network name displayed on the terminal does not change.

Or, in another embodiment, the processing unit 52 may discard a network name received by the receiving unit 51, and does not carry any network name in an MM INFORMATION message to a terminal, thereby also ensuring that the network name displayed on the terminal does not change.

Therefore, according to the embodiments of the present invention, a network name received by a receiving unit is processed and a mobility management information message is sent to a terminal according to a processing result to enable the terminal to always display a network name of a registered network of the terminal to avoid a change of the network name display of the terminal, thereby ensuring consistency in the network name display of the terminal, and improving user experience.

Each component of the mobility management network element device 50 provided in this embodiment of the present invention may perform each process of the methods illustrated in FIG. 1-FIG. 4, and therefore is not described herein any further.

The communications system according to this embodiment of the present invention may include the mobility management network element device 50.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design restriction requirements of the technical solutions. Persons skilled in the art may use different methods to implement the described functions for each particular application. However, such implementation shall not be considered as going beyond the scope of the present invention.

It may be clearly understood by persons skilled in the art that, for description convenience and brevity, for detailed working processes of the system, apparatus, and unit, reference may be made to the corresponding processes in the method embodiments, which are not described herein any further.

In the several embodiments provided in the present application, it should be understood that the disclosed system, apparatus, and method may be implemented in other manners. For example, the described apparatus embodiment is merely illustrative. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented over some interfaces. The indirect couplings or communicative connections between the apparatuses or units may be implemented in electrical form, mechanical form, or other forms.

Units described as separate components may be or may not be physically separated. Components shown as units may be or may not be physical units, that is, may be integrated or distributed to a plurality of network units. Some or all of the modules may be selected to achieve the objectives of the solutions of the embodiment according to actual needs.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of the present invention. The storage medium includes any medium that may store program code, such as a USB flash drive, a removable hard disk, a read-only memory (ROM), a random access memory (RAM), a magnetic disk, or an optical disk.

The foregoing descriptions are merely exemplary embodiments of the present invention, but are not intended to limit the present invention. Any modification, equivalent replacement, or improvement made within the technical scope disclosed by the present invention shall fall within the protection scope of the present invention. Therefore, the protection scope of the present invention is subject to the appended claims.

What is claimed is:

1. A network name processing method comprising:
   receiving, by a mobility management network element, a home network name of a mobile switching center/visitor location register (MSC/VLR) from the MSC/VLR;
   comparing, by the mobility management network element, the received network name with a network name of a registered packet switched (PS) network of a terminal;
   if the received network name is the same as the network name of the registered PS network of the terminal, keeping, by the mobility management network element, the received network name unchanged; and
   sending, by the mobility management network element, a mobility management information message to the terminal, wherein the mobility management information message carries the received network name.

2. A mobility management network element device, comprising:
   a receiver configured to receive a home network name of a mobile switching center/visitor location register (MSC/VLR) from the MSC/VLR; and
   a processor;
   a memory storing a program to be executed in the processor, the program comprising instructions for comparing the received network name with a network name of a registered PS network of a terminal, and if the received network name is the same as the network name of the registered PS network of the terminal, keeping the received network name unchanged; and
   a transmitter configured to send a mobility management information message to the terminal, and wherein the mobility management information message carries the the received network name.

3. A network name processing method comprising:
   receiving, by a mobility management network element, a home network name of a mobile switching center/visitor location register (MSC/VLR) from the MSC/VLR;
   comparing, by the mobility management network element, the received network name with a network name of a registered packet switched (PS) network of a terminal;
   if the received network name is different from the network name of the registered PS network of the terminal, replacing, by the mobility management network element, the received network name with the network name of the registered network of the terminal; and
   sending, by the mobility management network element, a mobility management information message to the terminal, wherein the mobility management information message carries the network name of the registered network of the terminal.

4. A mobility management network element device, comprising:
- a receiver configured to receive a home network name of a mobile switching center/visitor location register (MSC/VLR) from the MSC/VLR;
- a processor;
- a memory storing a program to be executed in the processor, the program comprising instructions for comparing the received network name with a network name of a registered PS network of a terminal, and if the received network name is different from the network name of the registered PS network of the terminal, replacing the received network name with the network name of the registered network of the terminal; and
- a transmitter configured to send a mobility management information message to the terminal, and wherein the mobility management information message carries the network name of the registered network of the terminal.

\* \* \* \* \*